March 5, 1968     T. J. SLONE ET AL     3,371,520
ELECTRICAL POROSIMETER

Filed Feb. 20, 1967     4 Sheets-Sheet 1

INVENTORS
THOMAS J. SLONE
LEONARD J. ORBECK
BY Herman L. Gordon
ATTORNEY

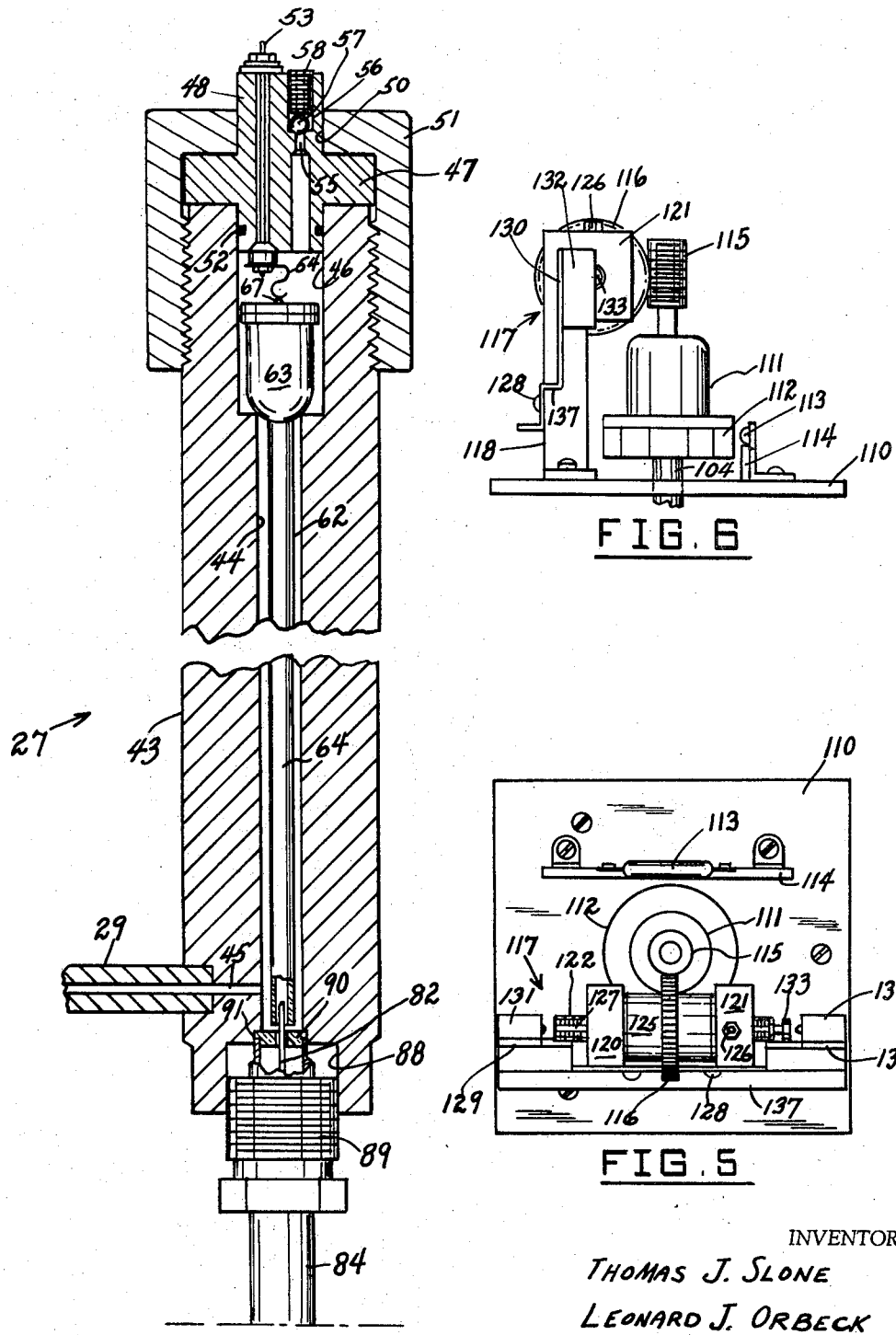

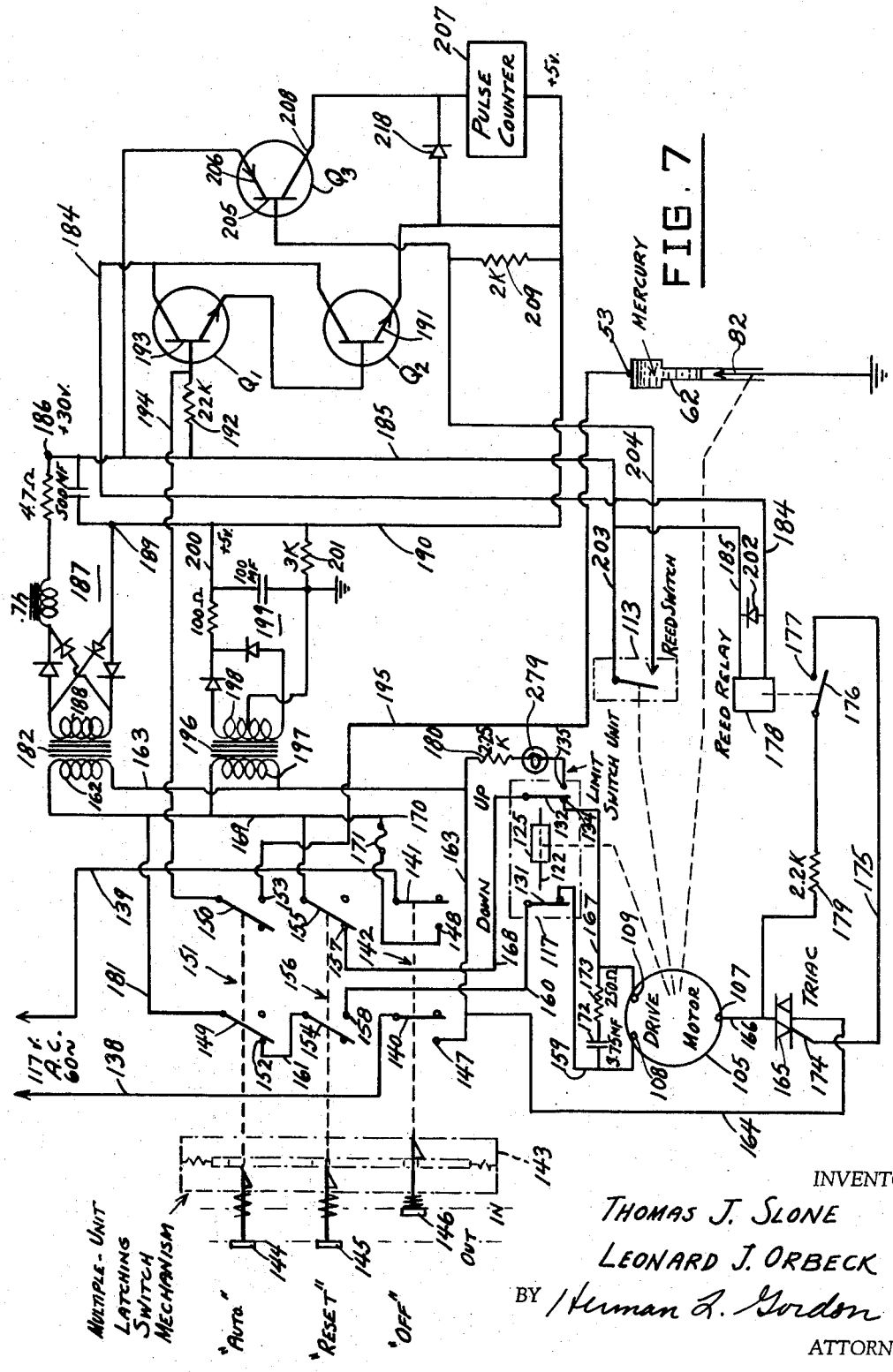

United States Patent Office 3,371,520
Patented Mar. 5, 1968

3,371,520
ELECTRICAL POROSIMETER
Thomas J. Slone, Silver Spring, and Leonard J. Orbeck, Hyattsville, Md., assignors to American Instrument Co., Inc., Silver Spring, Md.
Filed Feb. 20, 1967, Ser. No. 617,216
10 Claims. (Cl. 73—38)

ABSTRACT OF THE DISCLOSURE

A porosimeter consisting of a pressure chamber in which is mounted a penetrometer having a depending stem. A source of pressure fluid is connected to the pressure chamber and has an indicator to show the applied fluid pressure. The penetrometer contains mercury, which is forced up into the pores of sample material in the penetrometer under the applied fluid pressure. This causes the mercury to rise in the stem. A motor-driven probe rod is engaged in the stem through the bottom end thereof. The motor is energized through a Triac. A relay controls the application of gating potential to the gate electrode of the Triac. The relay is connected in the collector circuit of a normally conducting Darlington pair of transistors, normally maintaining the gating potential of the Triac by holding the relay energized. The probe is grounded and the input base electrode of the Darlington pair is connected to the mercury, so that the base electrode becomes grounded, turning off the Darlington pair, when the probe touches the bottom end of the mercury in the penetrometer stem. This deenergizes the relay, turning off the Triac and stopping the motor. The rotation of the motor shaft magnetically drives a reed switch which pulses a transistor amplifier whose output is connected to a pulse counter. The number of pulses counted from a zero starting position represents volumetric increments of pore penetration of the mercury into the sample material as the probe follows the upward movement of the bottom end of the mercury column in the penetrometer stem.

This invention relates to apparatus for measuring the sizes and volumes of the pores of porous materials, and more particularly to a porosimeter of the type employing the mercury intrusion method.

A main object of the invention is to provide a novel and improved apparatus for determining the pore size spectrum of penetrable or porous material by the mercury intrusion method, the apparatus being simple in construction, being easy to operate, and providing highly accurate readings which can be readily interpreted.

A further object of the invention is to provide an improved porosimeter of the completely hydraulic (gas-free) type which can be employed to measure a wide range of sizes of pores in solid materials, for example, pores ranging in size from the order of 75 microns to 30 angstroms in diameter and pore volumes of the order of 0.20 cc. per given sample weight, the measurements being made with a high degree of resolution and the apparatus being arranged so that the readout information provided thereby may be delivered to a remote location.

A still further object of the invention is to provide an improved porosimeter which includes a high pressure source capable of developing hydraulic pressure over a continuous wide range of values and which includes means to deliver the hydraulic pressure to a pressure chamber and to simultaneously provide respective accurate electrical indications of fluid pressures and resultant volume of intrusion, whereby data can be readily obtained for plotting a curve of pore volume against applied hydraulic pressure for the material under test, which thus gives the pore size spectrum of the material.

A still further object of the invention is to provide an improved porosimeter of the mercury intrusion type wherein the indications of mercury intrusion are derived electrically in a simple and direct manner, making it unnecessary to read a column of mercury visually and thereby eliminating a serious source of error present in previously known instruments of this type, the intrusion indications being presented as pulse counts corresponding to changes in height of a column of mercury in a tube of known constant internal cross-sectional area.

Further objects and advantages of the invention will become apparent from the following description and claims, and from the accompanying drawings, wherein:

FIGURE 4A is a fragmentary vertical cross-sectional view taken through the upper portion, including the pressure chamber, of an improved porosimeter constructed in accordance with the present invention, shown with the penetrometer of FIGURES 2 and 3 operatively mounted therein.

FIGURE 5 is a top plan view of the control assembly associated with the mercury contact electrode operating motor of the porosimeter, said view being taken substantially on the line 5—5 of FIGURE 4B.

FIGURE 6 is an end elevational view of the control assembly, said view being taken substantially on the line 6—6 of FIGURE 4B.

FIGURE 7 is a wiring diagram showing the connections of the electrical components of the motor control system and the pulse counting arrangement of the porosimeter of FIGURES 1 to 6.

In a porosimeter employing the mercury intrusion method as disclosed in U.S. Patent No. 3,073,357 or 3,022,657 to W. C. Hampton or in U.S. Patent No. 2,886,964, to J. J. Shapiro et al., a gas-free hydraulic system is used to transmit pressure from a suitable pressure generator to a pressure vessel containing a penetrometer having a chamber in which a quantity of sample material is disposed, the penetrometer (with the sample material) having been previously filled with mercury in any suitable manner, for example, by means of the apparatus and method disclosed in any one of the above-cited patents. A suitable hydraulic liquid, such as alcohol, is employed as the pressure transfer medium to transfer the pressure from the pressure generator to the pressure vessel and to cause the mercury in the penetrometer to be forced into the pores of the sample. By reading the position of the bottom of the mercury column in the penetrometer stem and the corresponding pressure in steps at appropriate intervals over a range of pressures during a test, data can be obtained which will give the volumes of penetration of the mercury into the sample (which is of known weight) at the various pressures, from which the pore spectrum of the sample material can be determined.

In our previously filed application S.N. 533,560, filed Mar. 11, 1966, and entitled "Porosimeter," an apparatus is disclosed which employs substantially the same technique as described in the above-mentioned prior patents except that the necessity of visually reading the position of the bottom of the mercury column is eliminated, and instead an electrical signal, based on capacitive effects, corresponding to this information is derived and is utilized for the purpose of determining the volume of penetration of the mercury into the pores of the sample material. In the present invention, a servo arrangement is employed to follow the bottom of the mercury column, and the change of position of the bottom of said column is translated into electrical pulses, each pulse corresponding to a unit of position change (equivalent to a unit of volume change the internal cross-sectional area of the penetrometer stem being constant). The pulses are counted by a conventional pulse counter, so that the readout provided by the pulse counter corresponds to the desired penetration volumetric data.

Figure 1:
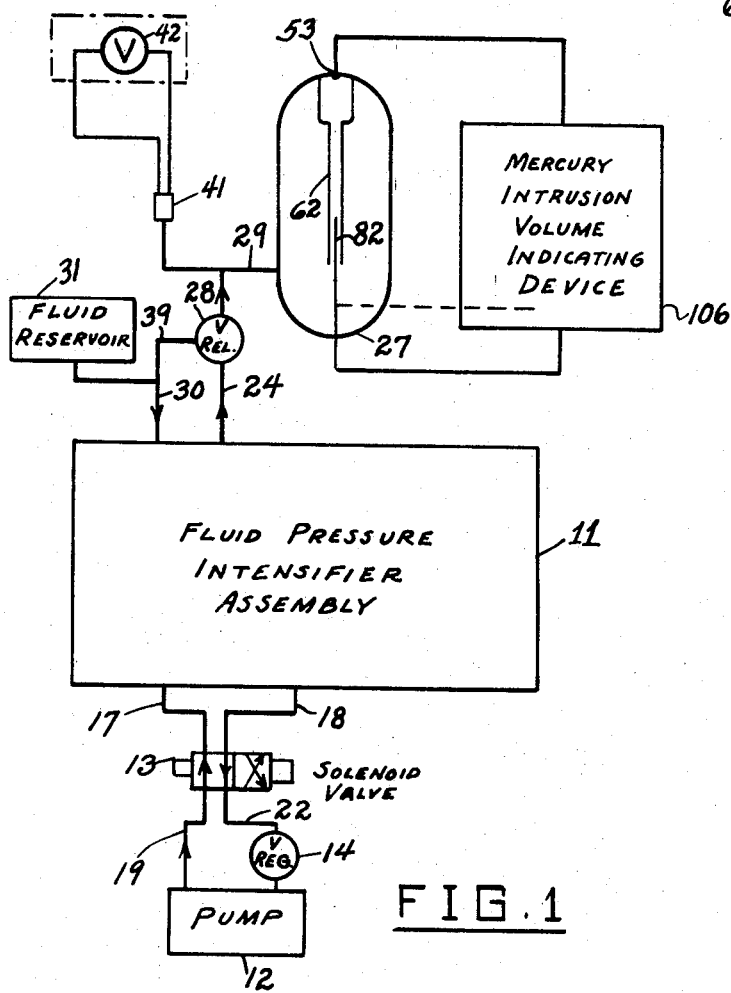
FIGURE 1 is a schematic diagram showing in simplified form the fluid conduit connections and some of the electrical connections of a typical porosimeter constructed in accordance with the present invention.

Referring to the drawings, and more particularly to FIGURE 1, 11 designates a pressure generator, which may comprise a fluid pressure intensifier assembly similar to that described in our previously filed application S.N. 533,560 above mentioned, providing a wide range of output pressures, the pressure generator 11 being actuated from a pump 12 through a solenoid-operated reversing valve 13 and a pressure-regulating valve 14. Fluid lines 17 and 18 lead from the solenoid valve 13 to respective sections (not shown) of a double-ended (two-section) fluid pressure intensifier included in the generator 11. In one position of valve 13, pump outlet line 19 is connected to the line 17 leading to the working space of one section of the fluid pressure intensifier while the working fluid of the other section thereof is allowed to pass through line 18 to the pump return line 22 (and through the pressure regulating valve 14). In the other position of solenoid valve 13, the connections of lines 17 and 18 are reversed, as explained in the above-mentioned prior application S.N. 533,560.

The output line 24 of the pressure generator assembly 11 is connected to the pressure vessel 27 through a pressure relief bypass valve 28 and a conduit 29. The bypass conduit 39 of relief valve 28 is connected to a return line 30 which is connected through suitable return conduits and check valves (not shown) to the respective fluid pressure intensifier output portions, to allow fluid to flow as required to and from a liquid reservoir 31 connected to return line 30. The operation of assembly 11 is fully described in our above-mentioned prior application S.N. 533,560, providing a wide range of output pressures in line 24.

The pressure of the fluid admitted through line 29 into the pressure vessel 27 is measured in a conventional manner by means of a pressure-sensitive electrical transducer unit 41 communicatively connected to the conduit 29. The electrical output of the transducer 41 is indicated by a suitably calibrated meter 42 connected to the transducer.

Figure 2:
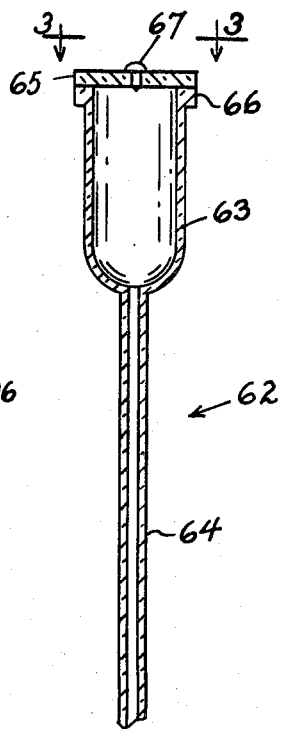
FIGURE 2 is a vertical cross-sectional view taken through a penetrometer assembly employed in the pressure vessel of the porosimeter of FIGURE 1.
Figure 3:
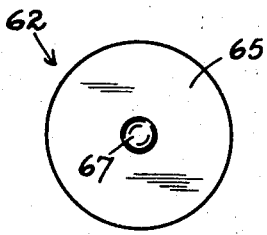
FIGURE 3 is an enlarged top plan view of the penetrometer assembly taken substantially on the line 3—3 of FIGURE 2.

Designated generally at 62 is a penetrometer assembly comprising the enlarged bell-shaped top portion 63 and the depending straight tubular stem portion 64. A circular cap 65 is sealingly and removably engaged on the top rim or flange 66 of bell portion 63. The penetrometer 63, 64 and disc-shaped cap 65 are made of glass or similar insulating material. Cap 65 is provided with a central headed metal contact pin 67 sealingly secured therein with its pointed bottom end exposed to the interior of bell portion 63, as shown in FIGURE 2.

The pressure vessel 27 comprises a thick-walled vertical main chamber 43 having a central bore 44. The conduit 29 is connected to the lower portion of chamber 43 in communication with a passage 45 leading to the lower portion of bore 44. The upper portion of chamber 43 has the counterbore 46 adapted to contain the bell portion 63 of penetrometer 62, with the stem 64 extending down through bore 44, as shown in FIGURE 4A. The upper portion of counterbore 46 removably receives a plug 48 provided with a relatively thick flange 47 which engages on the top rim of chamber 43. The upper portion of plug 48 extends through the central aperture 50 of a clamping cap 51 threadedly engaged on the top portion of chamber 43. The lower portion of plug 48 has an annular groove containing a resilient deformable sealing ring 52 making sealing contact with the adjacent surface of counterbore 46.

A terminal stud 53 is secured in and is suitably insulated from plug 48, a sinuously curved contact spring 54 being secured to the bottom end of stud 53 and being generally S-shaped, as shown in FIGURE 4A, and being somewhat laterally offset from stud 53 so as to conductively engage the head of the contact pin 67 of a penetrometer 62 positioned in chamber 43. Plug 48 is also provided with a vertical bleeder passage 55 having a top counterbore 56. A sealing ball 57 is seated in counterbore 56 covering the reduced top end of passage 55 and being held in sealing contact therewith by a vented screw plug 58 threadedly engaged in counterbore 56, as shown. The provision of the bleeder passage 55 allows the internal cavity of the pressure vessel 27 to be emptied of air when the cavity is being filled with liquid from the reservoir 31 at the beginning of a test, as will be presently described.

The pressure vessel 27 includes a lower thick-walled vertical chamber 68 having a central bore 69 in which is slidably mounted a metal sleeve member 70 formed with a longitudinal slot 71 extending for the major portion of the length of the sleeve member. A plug element 72 is sealingly secured in a counterbore 73 in the top portion of chamber 68 by a clamping nut 74 threadedly engaged in said counterbore. Plug element 72 has an outer shank 75 received in the central bore 76 of nut 74. The nut is formed with an inner counterbore 77 receiving the main body of the plug element and exerting clamping force thereon. Plug element 72 has a frusto-conical inner end portion 78 sealingly seating in the correspondingly shaped throat of an aperture 79 communicating with bore 69. Plug element 72 carries an inwardly projecting axial pin 80 slidably engaging in slot 71 and restraining sleeve member 70 against rotation.

Secured in the top end of sleeve member 70 is a metal plug 81 and rigidly secured centrally in plug 81 is a metal rod 82. The top end of chamber 68 is formed with a counterbore 83 in which is sealingly secured the lower end of a rigid vertical metal conduit 84, for example, by a conventional gland nut assembly 85 threadedly engaged in the counterbore 83 and surrounding conduit 84. The bottom end of conduit 84 is reduced and is sealingly received in an inner counterbore 86 in chamber 68 provided with suitable sealing packing 87.

As shown in FIGURE 4A, the top portion of conduit 84 is sealingly secured in a counterbore 88 provided in the bottom end of chamber 43, as by means of a conventional gland nut assembly 89. The top end of conduit 84 is reduced and is provided with a centrally apertured flanged top cover 90 through which rod 82 slidably extends. The reduced top end of conduit 84 and flanged top cover 90 are secured in an inner counterbore 91 provided in the main counterbore 88. As shown, the rod 82 extends slidably into the bore of the penetrometer stem 64.

Figure 4B:
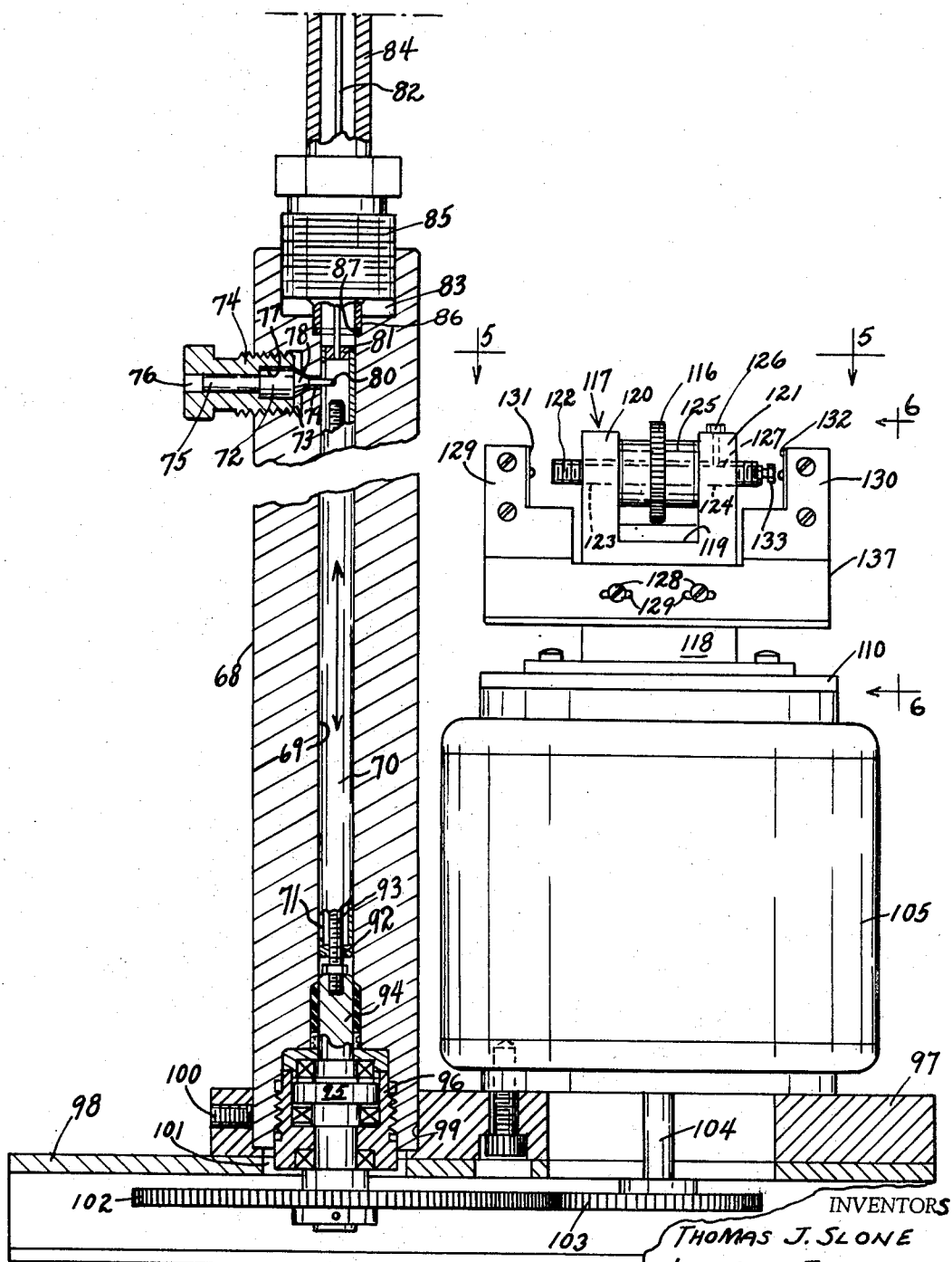
FIGURE 4B is a fragmentary vertical cross-sectional view taken through the lower portion of the porosimeter of FIGURE 4A.

Sleeve member 70 has a centrally tapped bottom end wall 92 in which is threadedly engaged a vertical drive screw 93, which is in turn rigidly secured to the top end of a vertical shaft 94 sealingly journalled in the bottom end portion of chamber 68. Thus, shaft 94 is provided with a bearing collar 95 rotatably received in a gland nut 96 threadedly engaged in the bottom end of chamber 68, with suitable anti-friction bearings provided above and below the collar 95, as shown in FIGURE 4B.

The bottom end of chamber 68 is rigidly secured in a horizontal metal block 97 which is, in turn secured on a horizontal supporting channel-shaped base 98. Thus, the bottom end of chamber 68 is received in an annular seat 99 formed in block 97 and is locked in the seat by a set screw 100, as shown. Shaft 94 extends through an aperture 101 in the top wall of base 98 and a large gear 102 is rigidly secured on the bottom end of shaft 94.

Gear 102 is meshingly engaged by a smaller drive gear 103 carried by the depending vertical shaft 104 of an electric motor 105 mounted on block 97 adjacent chamber 68.

Motor 105 is an alternating current two-phase bifilar synchronous stepping motor, which may be similar to the "Slo-Syn" Model No. SS250–1003 motor manufactured by Superior Electric Company, Inc., Bristol, Conn.

Motor 105 is included in the "Mercury Intrusion Volume Indicating Device" designated generally at 106 in FIGURE 1 and shown schematically as drivingly coupled to the rod element 82. Motor 105 has a common terminal 107 and respective phase input terminals 108 and 109.

Mounted on top of motor 105 is a horizontal support plate 110. Motor shaft 104 extends upwardly through an aperture in plate 110, and secured on said shaft is an adapter unit 111 including a six-pole rotating permanent magnet assembly 112. Arranged horizontally adjacent the periphery of the rotating magnet assembly is a magnetic reed switch unit 113, said unit 113 being supported on a conventional upstanding terminal strip 114 secured to plate 110. Switch unit 113 closes six times with each revolution of shaft 104.

The adapter unit 111 is provided at its top end with a vertical worm element 115 which meshes with a worm gear 116, forming part of a limit switch assembly designated generally at 117. Said limit switch assembly comprises an upstanding supporting block 118 secured on plate 110 and formed with a rectangular central notch 119 defining the spaced vertical arms 120 and 121. A horizontal stud 122 is rotatably and slidably supported in aligned horizontal bores 123 and 124 formed in the arms 120 and 121. A nut member 125 is threaded on the stud 122, rotatably fitting between the arms 120 and 121. The worm gear 116 is integrally formed on the nut member 125. A restraining screw 126 is threaded through the top portion of arm 121 and engages in a longitudinal keyway 127 formed in stud 122, preventing rotation of said stud. Thus, rotation of the worm gear 116 translates the stud 122 axially.

A horizontally extending bracket 137 is adjustably secured to block 118, as by means of clamping screws 128, 128 engaged through horizontal slots 129, 129 in the bracket 137 and threaded into block 118. The bracket 137 is formed at its opposite ends with upstanding arms 129 and 130 on which are mounted respective limit switches 131 and 132 whose operating plungers are located in positions to be engaged by the opposite ends of the stud 122. The end of stud 122 adjacent switch 132 is provided with an adjustable abutment screw 133.

As shown in FIGURE 7, switch 131 is of the single-pole, single throw, normally closed type and opens responsive to engagement by the left end of stud 122, as viewed in FIGURE 4B. Switch 132 is of the single-pole, double throw type, with its pole normally engaging a stationary contact 134, but disengaging therefrom and being moved into engagement with another stationary contact 135 responsive to engagement of the switch by the abutment screw 133.

In the "up" direction of movement of rod 82, stud 122 moves to the right, as viewed in FIGURE 4B, namely, toward limit switch 132. In the "down" direction of movement of rod 82, stud 122 moves to the left, namely, toward limit switch 131.

Referring to FIGURE 7, 138 and 139 designate a pair of supply wires connected to a suitable single-phase alternating current source. Line wires 138 and 139 are connected to the respective poles 140 and 141 of one double-pole switch section 142 of a conventional three-section push button switch assembly 143 of the type wherein the push buttons have "out" and "in" positions, and the assembly is provided with mechanical latching-release means which locks any push button in the "in" position when it is actuated and at the same time releases all the other push buttons and permits them to return to their "out" positions. Thus, the conventional assembly 143 comprises the three push buttons 144, 145 and 146 which are biased outwardly toward their "out" positions. The push button 146 is operatively connected to the double-pole switch assembly 142, and in the normal (non-operating) position of the apparatus, the push button 146 is in its "in" position, being latched therein, whereby the poles 140 and 141 are disengaged from respective stationary contacts 147 and 148. Poles 140 and 141 engage the respective contacts 147 and 148 responsive to the unlatching of push button 146, which occurs when either of the other push buttons 144 or 145 is actuated.

As shown, push button 144 is operatively connected to a pair of switch poles 149 and 150, forming part of a double-pole switch section 151. Pole 149 normally engages a stationary contact 152, and pole 150 is engageable with another stationary contact 153 responsive to the movement of push button 144 to its "in" position, at which time pole 149 disengages from contact 152. Similarly, push button 145 is operatively connected to a pair of switch poles 154 and 155 forming part of a double-pole switch section 156. Pole 155 normally engages a stationary contact 157 and pole 154 is engageable with another stationary contact 158 responsive to the movement of push button 145 to its "in" position, at which time pole 155 disengages from contact 157.

The phase terminal 108 of motor 105 is connected by a wire 159 through normally closed limit switch 131 and a wire 160 to switch contact 158. Pole 154 is connected by a wire 161 to switch contact 152. Pole 149 is connected by a wire 181 to one terminal of the primary 162 of a step-down transformer 182. The remaining terminal of said primary is connected by a wire 163 to the switch contact 147. Wire 163 is connected to the common motor terminal 107 by a wire 164 through a Triac 165 and a wire 166.

The phase terminal 109 is connected by a wire 167 through normally closed limit switch 132 and a wire 168 to switch contact 157. Pole 155 is connected by a wire 169 to wire 181. Wire 169 is connected by a wire 170 through a fuse 171 to switch contact 148.

A capacitor 172 and a resistor 173 are connected in series across motor phase terminals 108 and 109 to provide the phase shift necessary to operate the two-phase motor 105.

The gate electrode 174 of Triac 165 is connected by a wire 175 through the normally opened contacts 176–177 of a reed relay 178 and a resistor 179 to the wire 166. The Triac 165 is employed in conjunction with the relay 178 to provide fast motor control.

An indicator lamp 279 is connected between limit switch contact 135 and wire 163 through a resistor 180.

Reed relay 178 has an operating time of approximately 1 ms., while the Triac 165 provides power interruption of alternating current at the end of any half cycle. It is a solid state alternating current switch. Using a stepping motor with half cycle or less power interrupting control circuitry insures positive stopping without coasting.

The winding of relay 178 is connected in the collector output circuit of a Darlington pair of transistors $Q_1$, $Q_2$. As shown, the output wire of said Darlington pair is connected to one terminal of the relay winding. The other terminal of the relay winding is connected by a wire 185 to the positive D.C. voltage terminal 186 of a conventional rectifying and filtering power supply circuit 187 energized from the secondary of transformer 182. The negative power supply output terminal 189 is connected to a wire 190, which is in turn connected to the emitter 191 of transistor $Q_2$. The base 193 of transistor $Q_1$ is connected to wire 185 through a resistor 192, providing a normal forward bias on said base of the order of 30 volts positive when the supply circuit 187 is energized, unless the base is grounded, as will be presently described.

Base 193 is also connected by a wire 194 to pole 150 of switch section 151. Stationary contact 153 of said switch section 151 is connected by a wire 195 to terminal stud 53.

Another step-down transformer 196 is provided. The primary 197 thereof is connected across wires 169 and 163. The secondary 198 thereof is connected to and energizes a conventional full-wave rectifying and filtering power supply circuit 199, the center tap of the secondary being grounded and the positive voltage output wire 200 thereof being connected to wire 190. A resistor 201 is connected between wire 190 and ground. With the power supply circuits 187 and 199 energized and wire 194 ungrounded, there is thus a positive forward bias voltage of about 30 volts on base 193 and a positive volage of about 5 volts on emitter 191, whereby a substantial value of collector current flows through wire 184 and the winding of relay 177, causing the relay contacts 176–177 to be closed. Since probe rod 82 is grounded, when said rod 82 engages the mercury column in penetrometer 62, with switch contacts 150–153 closed, base 193 becomes grounded and the Darlington pair $Q_1$, $Q_2$ is reverse-biased by the 5 volt positive potential on emitter 191, which in effect turns off the current in collector wire 184 and causes relay 178 to become deenergized.

A suitably poled diode 202 is connected across the winding for relay 178 to suppress transient negative voltage peaks generated by the deenergization of relay 178.

Wire 185 is connected by a wire 203 through the reed switch 113 and a wire 204 to the base 205 of a transistor $Q_3$ whose emitter 206 is also connected to wire 185. A conventional pulse counter 207 is connected between the collector 208 of transistor $Q_3$ and wire 190. A suitably poled diode 218 is connected across pulse counter 207 to suppress transient negative voltage peaks in the same manner as the diode 202. A suitable resistor 209 is connected between wire 204 and wire 190. The impulse counter 207 is pulsed by transistor $Q_3$, which is turned on when reed switch 113 is open and is turned off when switch 113 is closed (zero voltage between base 205 and emitter 206 prevents base-emitter current flow). As above mentioned, reed switch 113 is opened and closed by being in proximity to the six-pole rotating magnet 112 driven by motor 105. The gear ratio of gears 102, 103 is chosen to provide 2000 pulses with a 137 mm. stroke of the probe rod 82. In a typical design, the 137 mm. stroke represents 0.2 ml. Therefore, one pulse count represents 0.1 microliter.

In performing a test, a known weight of the sample is placed in the penetromer bell portion 63 and the cap 65 is mounted thereon. A sealing film of silicone grease may be employed between cap 65 and rim 66. The penetrometer may then be filled with mercury in a known manner, for example, in the manner described in U.S. Patent No. 3,022,657, 2,886,964 or 3,073,357, as above mentioned. Thus, the penetrometer may be first placed in a vacuum chamber, stem down. Mercury is then admitted into the vacuum chamber, covering the lower end of the penetrometer stem. The vacuum chamber may then be vented, whereby the mercury is forced up the penetrometer stem, filling the voids communicating with and around the sample. The mercury-filled penetrometer 62 is then ready to be installed in the pressure chamber 43 in the position thereof shown in FIGURE 4A.

Before the penetrometer is installed, the "Reset" push button 145 is operated to its "in" position. This releases push button 146, closing switch contacts 140–147 and 141–148. Parallel-connected transformer primaries 162 and 197 are energized by a circuit comprising line wire 138, contacts 140–147, wire 163, the parallel-connected transformer primary windings, wire 169, wire 170, fuse 171, contacts 141–48 and line wire 39. Power supply circuits 187 and 199 become energized, and normal collector current flows through wire 184 and the winding of relay 178, energizing the relay and closing contacts 176–177. Gating bias is applied to gate 174 from wire 166 through resistor 179, contacts 176–177 and wire 175, since "reset" contacts 154–158 are closed and a circuit is established comprising line wire 139, contacts 141–148, fuse 171, wire 170, wire 169, wire 181, contacts 149–152, wire 161, contacts 154–158, wire 160, limit switch 131, fire 159, motor terminals 108 and 107, wire 166, Triac 165, wire 164, contacts 147–140 and line wire 138. Triac 165 is turned on, energizing the motor 105 in a direction to retract the probe rod 82. The probe rod 82 will be retracted until stud 122 moves sufficiently leftward, as viewed in FIGURE 7, to open limit switch 131, interrupting the motor circuit.

The mercury-filled penetrometer 62 is then installed in the chamber 43 in the manner shown in FIGURE 4A. The bleeder plug 58 is unscrewed to allow air to vent from the interior of the pressure chamber 27. The fluid pressure generator assembly 11 is first operated until all the air is purged from the pressure chamber through the bleeder passage 55 (liquid rises into counterbore 56). The bleeder plug 58 is replaced and is closed tightly, forcing sealing ball 57 onto its seat. This seals the pressure vessel 27.

The "Auto." push button 144 is then operated to its "in" position, releasing the "Reset" push button 145 and returning poles 154 and 155 to the positions thereof shown in FIGURE 7. Contacts 150–153 are thus closed, connecting base 193 to stud 53 through wire 194, contacts 150–153, and wire 195. Motor 105 will be energized in a direction to move probe rod 82 upwardly by a circuit comprising line wire 138, contacs 140–147, wire 164, Triac 165 (which continues to conduct since relay 178 remains energized), wire 166, motor terminals 107 and 109, wire 167, contact 134 and the pole of limit switch 132, wire 168, contacts 157–155, wire 170, fuse 171, contacts 148–141, and line wire 139. The probe rod 82 will be elevated until it touches the mercury in stem 64. This grounds base 194 and deenergizes relay 178, turning off Triac 165 and stopping motor 105. Since there is "zero" pressure (the starting pressure for the test) in the system at this time, the counter 207 is manually reset to zero.

Pressure is then applied by manipulating valve 14 and the control switch of pump 12. As the pressure is applied, the mercury will be forced up in the stem 164 into the pores of the sample. The probe rod 82 will follow, since as the mercury disengages from the probe rod, relay 178 again becomes energized and its contacts 176–177 close, restoring gating voltage to gate electrode 174 and turning on the Triac 165, whereby motor 105 is again energized to again elevate probe rod 82 to reestablish contact with the mercury. The pulse counter 207 counts the pulsations of reed switch 113, as above explained, providing the volumetric increment data. Thus, during the test pressure data from meter 42 and volumetric data from counter 207 may be obtained.

After maximum pressure for this test is reached and the last data point is recorded, the "Reset" push button 145 is actuated to fully retract probe rod 82.

The circuit of FIGURE 7 may be deenergized by actuating push button 146 to its "in" position.

In the event that the probe rod 82 is elevated to a predetermined upper limit in stem 64 during a test, abutment screw 133 engages limit switch 132, opening the circuit of motor 105 at contact 134 and energizing the warning lamp 279 through a circuit comprising line wire 138, contacts 140–147, wire 163, resistor 180, lamp 279, contact 135 and the pole of limit switch 132, wire 168, contacts 157–155, wire 70, fuse 71, contacts 148–141 and line wire 139.

While a specific embodiment of an apparatus for measuring the sizes and volumes of the pores of porous materials by the mercury intrusion method has been disclosed in the foregoing description, it will be understood that various modifications within the spirit of the invention may occur to those skilled in the art. Therefore it

What is claimed is:

1. In a porosimeter, a pressure vessel, a penetrometer mounted in said pressure vessel and having a depending stem of substantially constant internal cross-sectional area open at its bottom end, means to admit pressure fluid into the pressure vessel, liquid in the penetrometer and extending downwardly in said stem, the location of the bottom end of the liquid changing with the pressure on said pressure fluid, a probe element movably mounted in said stem, means to move the probe element in the stem toward contact with the liquid, and means to measure the degree of movement of the probe element in the stem required to bring it into contact with the bottom end of the liquid in the stem, whereby to obtain volumetric penetration data of the liquid into sample material in the penetrometer with changes of pressure on said pressure fluid.

2. The penetrometer of claim 1, and wherein the liquid is conductive and the probe element is of conductive material, said means to move the probe element comprising an electric motor, means drivingly coupling the motor to said probe element, an energizing circuit connected to said electric motor, and means to open said circuit responsive to contact of the probe element with the liquid.

3. The penetrometer of claim 2, and wherein the means to open the circuit comprises an electronic switch element connected in the circuit and having a gating electrode, circuit means applying gating potential to said gating electrode to render the switch element conducting, and means to open said last-named circuit means responsive to contact of the probe element with the liquid.

4. The porosimeter of claim 3, and wherein said electronic switch element comprises a Triac.

5. The porosimeter of claim 3, and wherein said last-named circuit means comprises relay means having a pair of contacts, a source of gating potential, means connecting said gating electrode to said source through said contacts, and means operatively connected to said relay means opening said contacts responsive to contact of the probe element with the liquid.

6. The porosimeter of claim 5, and wherein the relay means comprises a Darlington pair of transistors, a relay having an operating winding connected in the collector circuit of said Darlington pair and controlling said contacts, said Darlington pair having an input base electrode, means normally applying forward bias potential to said base electrode, and a current source connected to said Darlington pair to provide normal collector current therein, and wherein the means opening said contacts comprises means to remove the forward bias potential on said base electrode responsive to contact of the probe element with the liquid.

7. The porosimeter of claim 2, and means to open the energizing circuit of the motor responsive to the movement of the probe element to a predetermined limiting position in the penetrometer stem.

8. The porosimeter of claim 2, and wherein the motor is provided with a rotatable shaft element and the means to measure the degree of movement of the probe element comprises means measuring the amount of rotation of the motor shaft element.

9. The porosimeter of claim 8, and wherein the means measuring the amount of rotation of the motor shaft element comprises pulse generating means driven by the motor shaft element, a pulse counter, and circuit means connecting the output of said pulse generating means to said pulse counter.

10. The porosimeter of claim 9, and wherein said pulse generating means comprises a magnet drivingly connected to said motor shaft element, a magnetic reed switch mounted in operatively proximity to said magnet, a transistor amplifier, circuit means connecting the reed switch in the input circuit of said transistor amplifier, and circuit means connecting the output of said transistor amplifier to the pulse counter.

References Cited

UNITED STATES PATENTS

| | | | |
|---|---|---|---|
| 2,483,333 | 9/1949 | Cannon et al. | 33—126 |
| 2,632,324 | 3/1953 | Oberlin | 73—304 XR |
| 2,641,942 | 6/1953 | Reichertz | 73—38 |
| 3,073,357 | 1/1963 | Hampton | 73—38 |

LOUIS R. PRINCE, *Primary Examiner.*

WILLIAM HENRY II, *Examiner.*